May 17, 1932. P. KANE 1,859,208
HARVESTER
Filed April 19, 1930 3 Sheets-Sheet 3
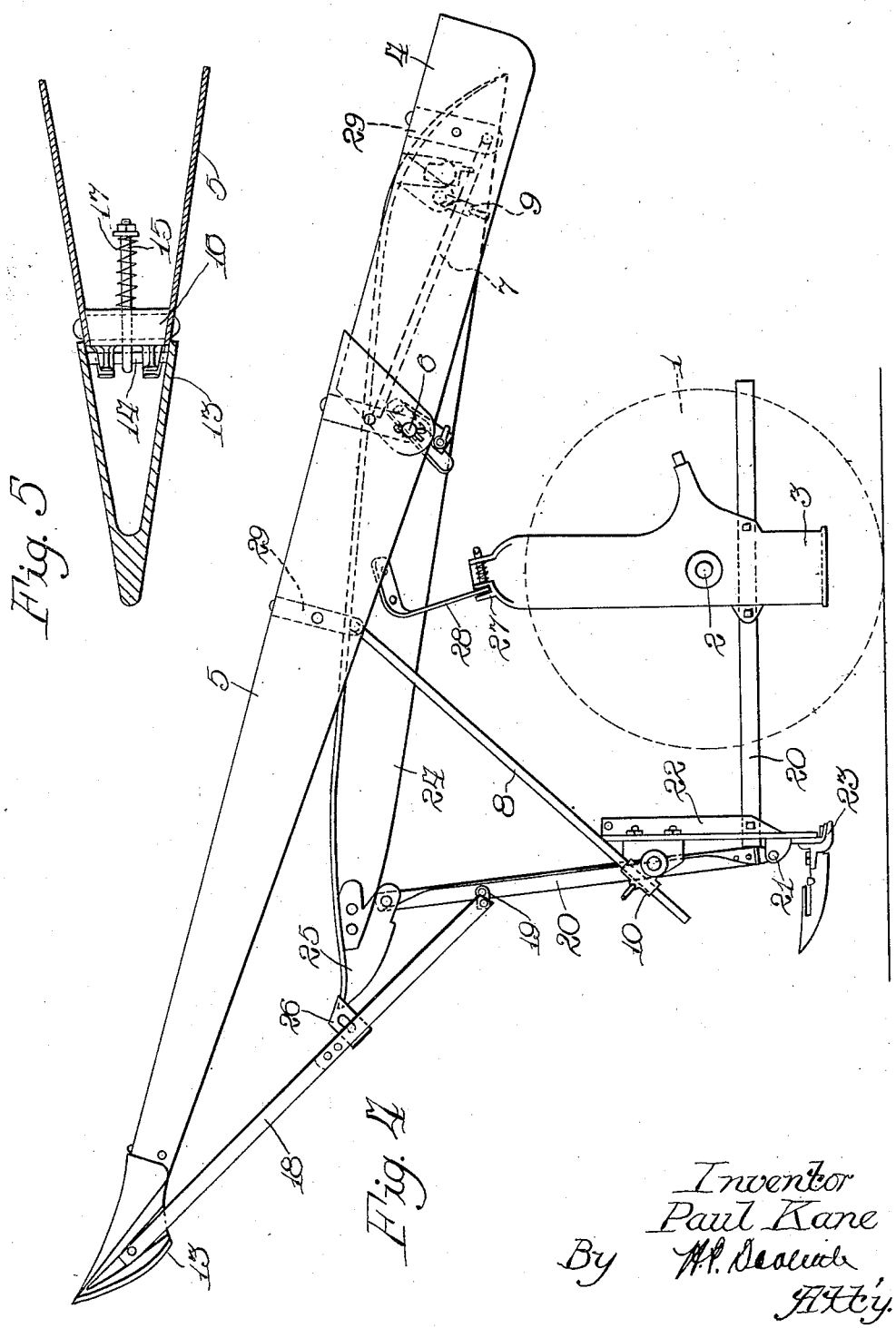

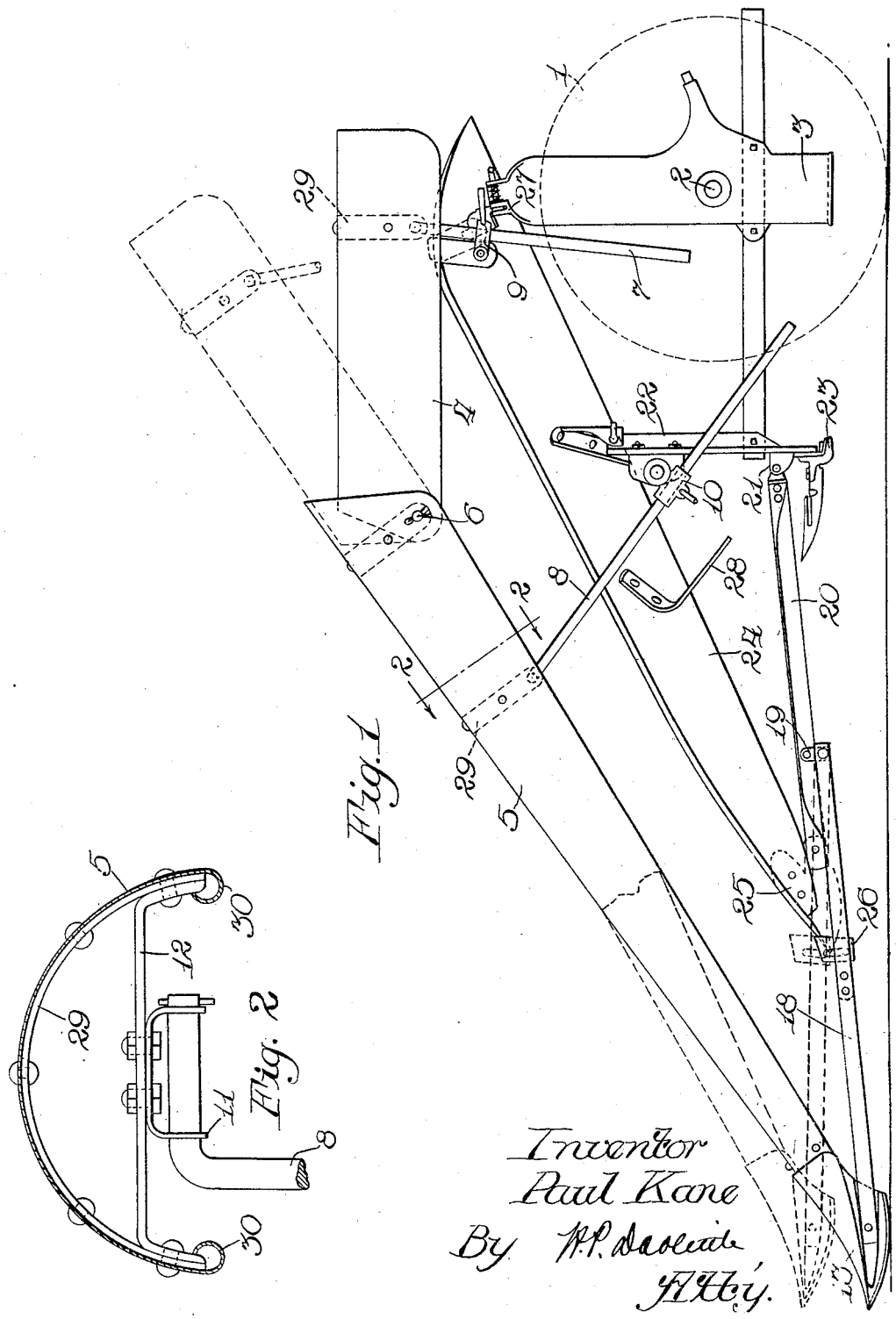

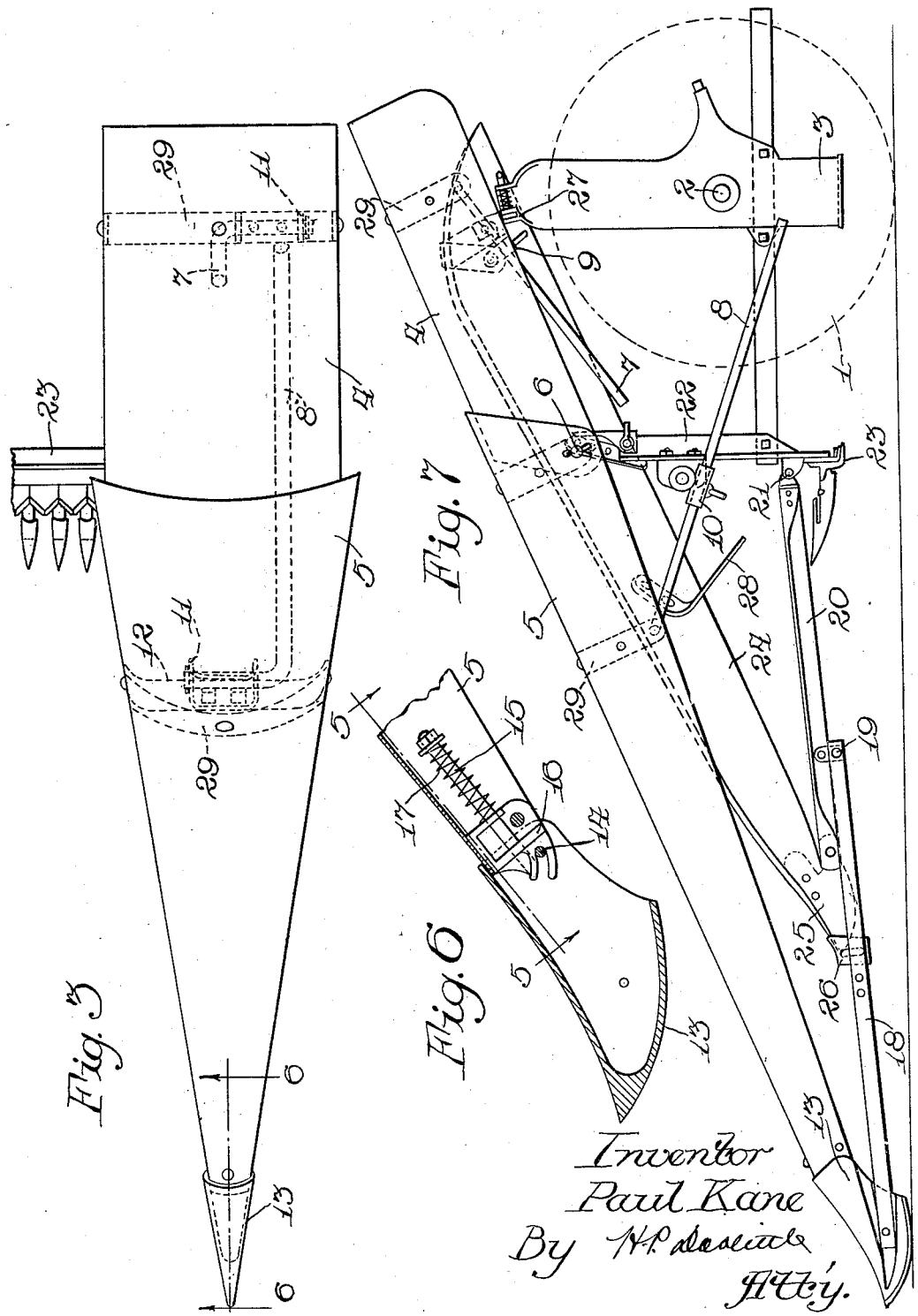

Patented May 17, 1932

1,859,208

UNITED STATES PATENT OFFICE

PAUL KANE, OF NEUSS, GERMANY, ASSIGNOR TO INTERNATIONAL HARVESTER COMPANY, A CORPORATION OF NEW JERSEY

HARVESTER

Application filed April 19, 1930, Serial No. 445,760, and in Germany May 16, 1929.

This invention relates to reaping machines and grain harvesters and especially to the so-called outer divider of the platform for such machines.

In reaping and similar machines, it is well known to provide an outer divider, which serves primarily to separate a particular section of grain to be cut from the main growing crop, and these dividers have been designed with the secondary object of raising that part of the grain near the divider (in cases where the crop tends to hang over or lie on the ground) so that this part of the grain does not become entangled in the machine as it passes. The dividers have also been designed so that they do not present sharp corners or edges to the standing crop, which might break the stalks and cause the heads to hang over in the direction of the machine.

To meet the above requirements, dividers of a semi-conical form have been used, which present a smooth and tapering surface to the crop. Hitherto, however, dividers of this form have had the disadvantage that they have been constructed in one piece, so that their adjustment was of a limited nature only, and, further, the rear end of the divider extended above the heads of the standing crop, so that when adjusted at certain positions, the grain failed to flow over this part of the divider and was liable to become retarded, so causing clogging and stopping. A further disadvantage of known dividers of this type was that, when it was required to transport the machine, the divider could not be folded and had to be detached.

It is the object of the present invention to provide an improved supplementary, outer divider which shall be capable of various adjustments to meet the requirements of different crops and crop conditions, and which may be readily folded when the machine is transported. A further object is to construct the divider so that it may be fitted over the existing outer divider to permit of its ready attachment or detachment from a machine without other modification to the machine being necessary.

An embodiment of the invention is shown in the accompanying sheets of drawings, in which:

Figure 1 shows a side view of the divider associated with a grain binder;

Figure 2 is a cross sectional view, as seen along the line 2—2 appearing in Figure 1;

Figure 3 is a plan view;

Figure 4 is another side view of the divider, showing the same in its folded position for transport;

Figure 5 is a plan sectional view through the divider point as seen along the section line 5—5 appearing in Figure 6;

Figure 6 is a side, sectional view through the divider point as seen along the section line 6—6 appearing in Figure 3; and, Figure 7 shows another side view with parts lowered to an intermediate position of working in grain of shorter length.

In the drawings, 1 is the grainward wheel of the reaper, grain harvester or like machine, which is supported on an axle 2 mounted in the bracket 3. The divider consists primarily of the two portions 4 and 5, which may conveniently be made of single metal sheets bent to form a semi-circular or arcuate section, as shown in Figure 2, or the portions could be made in sections riveted together. The lower portion 5 tapers towards one end and the opposite end is pivotally connected to the other portion 4 by pivot 6, so that, when the two are extended in a straight line, the divider resembles a section of the surface of a cone or torpedo, as will be understood from the drawings. In other words there are sections arranged longitudinally end to end, with both sections curved transversely and the front section being drawn out to a point. The portions may be strengthened at convenient points by bridge pieces 29 and the sides may be beaded, as shown at 30 in Figure 2.

The portions are supported by rods 7 and 8 in the clamping pieces 9 and swivel clamping brackets 10, respectively, suitably carried on the framework, while the opposite ends are bent at right angles and are carried in the brackets 11, which are secured on cross-braces 12 riveted to the inside of the divider portions, as best shown in Figure 2.

The narrow end of the lower portion 5 of the divider terminates in the pointed shoe or runner 13. The shoe is provided with a pin 14 which is carried in a forked extension of an angle bracket 16 secured in the end of the divider. The bent end of a rod 15 passes over the pin 14 to hold it in the hook, and the rod end is held firmly against the pin by the coiled spring 17, which is kept under tension between one side of the angle bracket 16 and a nut on the end of the rod 15. (See Figure 6.) In this manner the shoe protects the end of the divider, but the divider is able to move in a vertical direction.

The shoe 13 is supported by a rod or bar 18 pivotally connected by a hinge 19 to a further rod or bar 20, the latter being hinged at 21 on the angle iron support 22. The bar 18 may be connected to the hinge by a split pin or bolt so that the two parts may be readily taken apart.

The support 22 is connected to the grainward end of the cutter bar 23 at its lower extremity, and the upper end supports the usual inclined flat outer divider 24 generally used on these machines. The lower end of the divider 24 carries the usual point 25 which rests upon the bar 18 and is held by the slotted casting 26 secured to the bar 18, which is of a bridge form so as to fit loosely over the point of the shoe. The upper end of the divider 24 is provided with a pin or bolt which rests in the slotted bracket 27 in the top of the frame 3, to support the divider at its rear end.

It will be seen that with the construction described the shoe 13 of the divider can float according to irregularities of the ground, since the bar which carries it is pivoted at 19 and the divider is pivotally carried by the rods 7 and 8 carried in the swiveling strap and brackets 9 and 10. The movement of the shoe is guided by the slotted casting 26, since the bar 18 can move vertically in the slot, but a lateral movement is prevented. In this manner the shoe will readily conform to the contour of the ground as the machine moves through the grain. The position of the shoe 13 when in a raised position is shown by the dotted lines in Figure 1. By adjusting the rods 7 and 8 in the clamping strap 9 and bracket 10, the height of the divider may be adjusted to suit the crop being cut, as illustrated in Figures 1 and 7. Moreover, the rear portion 4 of the divider may be adjusted to the position shown in dotted lines in Figure 1 or lowered to the position shown in the full lines, or to the intermediate positions, as required (see Figure 7). The lower position is suitable when working the machine in comparatively short crops, as the tops of the grain will slide along the horizontal part 4 of the divider and will not become entangled and the flow of the grain arrested as it passes.

It will thus be appreciated that this arrangement of the divider is very useful and convenient since it permits of wide adjustments of the divider to suit the many different requirements met in practice. Moreover, the rods 7 and 8 may be slipped out of the brackets 9 and 10 and the bolt or pin 19 taken out, so that the divider and rod 18 may be removed from the machine and the ordinary divider 24 may then be used alone.

Figure 4 shows the divider folder for transport. It will be seen that the clamp 9 is unfastened so as to release the rod 7 which is folded, as shown,—the rod 8 being removed from bracket 10 in like manner. The bar 20 is then raised to the position shown carrying with it the ordinary divider and the shoe of the supplementary divider, as shown. The bracket 28 of the ordinary divider 24 is carried in the slot 27 in frame 3, thus forming a support, and the upper end of the supplementary divider rests on the end of the ordinary divider. In this manner, the supplementary divider is folded to come within the limits of the length of the machine when the machine is mounted on the usual transport wheels to be moved endwise, as is the usual practice.

In the drawings, the divider is shown as a supplemental or additional divider for working in exceptionally long and tangled grain, with the normal divider underneath, but it should be understood that the semi-conical divider could also be provided on the machine in place of the normal divider.

From the above detailed disclosure it must now be apparent that an improved divider has been provided, which achieves all of the desirable objects heretofore recited and that the same is simple and practicable in use and easily adapted for manufacture.

It is the intention to cover all such changes and modifications of the illustrative embodiment herein shown and described, by way of example, as do not materially depart from the scope of this invention, as indicated by the following claims.

What is claimed is:

1. An outer divider for a harvester having a frame, said divider comprising two divider sections arranged longitudinally end to end and pivotally connected together, each of said sections presenting a surface curved transversely in cross section with the front section drawn out to a point, and means for supporting said sections.

2. An outer divider for a harvester having a frame, said divider comprising two divider sections arranged end to end and pivotally connected together, supports pivotally connected to said sections, and clamps for adjustably mounting said supports for setting the sections in different positions relative to each other.

3. An outer divider for a harvester having a frame carrying a cutter bar having a fixed position on said frame, said divider comprising two divider sections arranged longitudinally end to end and pivotally connected together about a transverse axis with the front section having a shoe normally riding on the ground, and connections supporting said sections on the frame independently of the cutter bar to enable folding movement of the sections as a unit relative to the frame to a raised position off the ground for transport purposes.

4. In a harvester, the combination comprising a frame, an outer divider carried by the frame, a supplementary divider arranged above said first divider, said supplementary divider comprising two divider sections arranged end to end and pivotally connected together, and means for supporting said two divider sections of the supplementary divider on the frame.

5. In a harvester, the combination comprising a frame, an outer divider carried by the frame, a supplementary divider disposed above the outer divider, said supplementary divider comprising two sections arranged longitudinally end to end and pivotally connected together, a runner shoe pivotally and yieldingly connected to the forward end of the front section, each of said sections presenting a surface curved transversely with the front section tapered to a point at its front end, and means for supporting the supplementary divider.

6. In a harvester, the combination comprising a frame, an outer divider carried by the frame, a supplementary divider disposed above the outer divider, said supplementary divider comprising two sections arranged longitudinally end to end and pivotally connected together, a runner shoe pivotally and yieldingly connected to the forward end of the front section, each of said sections presenting a surface curved transversely with the front section tapered to a point at its front end, and articulated connections between the outer divider and supplementary divider and between the entire divider structure and frame whereby the said entire divider structure may be folded upwardly to a position raised off the ground and above the frame for transport.

7. In a harvester, the combination comprising a frame, an outer divider carried by the frame, a supplementary divider disposed above the outer divider, said supplementary divider comprising two sections arranged longitudinally end to end and pivotally connected together, a runner shoe pivotally and yieldingly connected to the forward end of the front section, each of said sections presenting a surface curved transversely with the front section tapered to a point at its front end, means for pivotally connecting the outer divider and front section of the supplementary divider to the frame, adjustable means for supporting the front section of the supplementary divider on the frame, and separate means for adjustably supporting the rear section of the supplementary divider.

8. An outer divider for a harvester having a frame, said divider comprising front and rear divider sections arranged longitudinally end to end and pivotally connected together about a transversely disposed axis, a shoe pivotally and yieldingly connected to the front section, and separate supporting means for carrying the respective sections.

9. An outer divider for a harvester having a frame, said divider comprising front and rear divider sections arranged longitudinally end to end and pivotally connected together about a transversely disposed axis, each of said sections presenting a surface curved transversely in cross section with the front section drawn out to a point, and means for supporting said sections.

In testimony whereof I affix my signature.
PAUL KANE.